United States Patent Office 3,531,564
Patented Sept. 29, 1970

3,531,564
FLUORIDE DENTAL PREPARATION
Alexander Wayne Bouchal, Westfield, and Gerhard M. Salzmann, Franklin Lakes, N.J., assignors to Colgate-Palmolive Company, New York, N.Y., a corporation of Delaware
No Drawing. Filed Sept. 15, 1966, Ser. No. 579,497
Int. Cl. A61r 7/16
U.S. Cl. 424—52          15 Claims

ABSTRACT OF THE DISCLOSURE

Dental preparation containing a water-soluble fluoride compound and an olefin sulfonate detergent material which comprises at least about 95% water-soluble detergent compound, said detergent material including at least about 62% of a water-soluble long chain alkenyl sulfonate. This preparation does not cause an adverse "orange juice effect" and is not susceptible to loss of undesirably great amounts of fluoride ion.

---

This invention relates to a fluoride dental preparation. In particular, it relates to a dental preparation including an olefin sulfonate as a detergent and a water-soluble fluoride.

Detergents have been used in dental preparations for several years. They have the advantages over prior soap-containing dental preparations of being more effective foaming agents. However, certain problems, such as inadequate foaming and instability, have remained even in some dental preparations containing detergents and in particular in dental preparations which also contain fluorides.

Moreover, the use of detergents in dental preparations has often caused an undesirable taste to be noted when acidic foods, such as fruits or juices, are brought into contact with the oral cavity shortly after contact of the oral cavity with a detergent-containing dental preparation, such as a dentifrice. This is commonly called the "orange juice effect."

It is an object of this invention to provide a detergent-containing dental preparation which has an unexpectedly good taste, is substantially free of undesirable "orange juice" flavor reaction, does not irritate tender mucous membranes in the oral cavity, exhibits excellent rapid foaming characteristics in the oral cavity, has superior antibacterial activity, and has superior foaming and stability characteristics on storage at elevated temperatures and even at an acid pH. Other objects will be apparent from consideration of the following description.

In accordance with certain aspects, this invention relates to a dental preparation comprising a water-soluble fluoride compound, an olefin sulfonate detergent material comprising at least about 95% water-soluble detergent compound, said detergent material including at least about 62% by weight of a water-soluble long chain alkenyl sulfonate, and a dental dispersing agent compatible with said detergent material.

In the co-pending patent application of Henry Leon Levinsky and Joseph Rubinfeld, Ser. No. 579,524, filed on even date herewith, and now U.S. Pat. 3,462,525, patented Aug. 19, 1969, a novel dental preparation is described, which dental preparation includes an olefin sulfonate detergent and a compatible dental dispersing agent.

It has now been found that when fluoride-containing dental preparations are employed, storage-stable dental preparations which are not susceptible to loss of stannous ion, if present, and are not susceptible to loss of fluoride ion can be obtained. Moreover, even upon storage at elevated temperatures or at room temperature for extended periods of time or upon storage at an acid pH they retain highly satisfactory foaming and taste characteristics, if olefin sulfonate detergent material employed is substantially free of (that is, contains no more than 5% by weight) acetone-soluble and water-insoluble impurities. Moreover, the substantial absence of acetone-soluble constituents enhances the mutual compatibility of the components of the dental preparation. The compositions which are utilizable in accordance with this invention include preparations designed for application to the oral cavity. These compositions are referred to herein as dental preparations and include dentifrices such as toothpastes or dental creams, tooth powders and liquid dentifrices, mouth washes or rinses, dental chewing gums, dental floss, tablets, lozenges and troches.

In accordance with certain aspects of this invention the dental preparation is substantially liquid in character, such as a mouth wash or rinse. In such a preparation the dispersing agent compatible with alkenyl sulfonates is typically a water-alcohol mixture. Generally, the ratio of water to alcohol is about 1–20:1 by weight, preferably about 3–20:1 by weight, most preferably about 17:3 by weight. The total amount of water-alcohol in this type of preparation is typically about 70–99.95% by weight of the preparation. The pH of such liquid preparations is generally about 4.5–9, typically about 5.5–8.

In the formulation of such liquid dental preparations the olefin sulfonate detergent material is typically present in amount of about 0.05–10%, preferably about 0.1–7%, most preferably about 0.6%, based on the weight of the preparation.

Certain other ingredients may also be employed in the liquid dental preparations. These include adjuvants for color, for flavor, for smoothness, such as polyols, e.g., sorbitol and glycerine, and bacteriostatic agents. Typical bacteriostatic agents are quaternary ammonium compounds having the formula

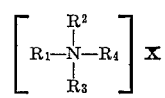

wherein $R_1$ is a hydrophobic radical selected from the group consisting of aliphatic, cycloaliphatic, acyl, aliphaticaryl and arylaliphatic radicals, $R_2$, $R_3$, and $R_4$ are each hydrocarbon radicals having 1–10 carbon atoms, the sum of the carbon atoms in $R_2$, $R_3$, and $R_4$ being 3–12 and X is a salt-forming radical. A typical quaternary compound of this type is para-di-isobutyl-phenoxyethoxy-ethyl dimethyl benzyl ammonium chloride (sold as Hyamine 1622).

Surface active agents in addition to the olefin sulfonates may also be employed in the liquid dental preparations of this invention. When bacteriostatic agents such as those described above are employed, it is preferred to include surface active agents such as the polyoxyethylene derivatives partial fatty acid esters of hexitol anhydrides (sold as Tweens).

In accordance with certain further aspects of this invention, the dental preparation is substantially solid in character, such as a tooth paste or dental cream or a tooth powder. In such a preparation the dispersing agent compatible with olefin sulfonates is a water-insoluble dental polishing material.

The polishing agent may be any of the type commonly employed in dental preparations. These include water-insoluble sodium metaphosphate, potassium metaphosphate, tricalcium phosphate, dihydrated dicalcium phosphate, anhydrous dicalcium phosphate, calcium pyrophosphate, magnesium orthophosphate, trimagnesium phosphate, calcium carbonate, alumina, aluminum silicate, zirconium silicates and mixtures thereof. The most preferred polishing agents are insoluble sodium metaphosphate and dihydrated and anhydrous dicalcium phosphate. Typically the polishing agent is finely divided and has an average particle size below about 10 microns, preferably about 2–6 microns and most preferably about 3.5–5 microns.

When a water-insoluble dental polishing agent is employed as the compatible vehicle for the olefin sulfonate, it is typically employed in amount of about 20–29% by weight of the dental preparation. Preferably it is present in amount of about 20–75% in tooth paste and about 70–99% in tooth powder.

In the solid dental preparations of this invention, the olefin sulfonate detergent material is typically present in amount of at least about 0.05% by weight, preferably about 0.1–10% and most preferably 0.5–5%.

The substantially solid dental preparations including polishing agent as the compatible dispersing agent may contain liquid ingredients when in the form of a tooth paste. Such liquid ingredients include water, typically in amount of 10–20% by weight of the prepartaion. Glycerine, sorbitol, propylene glycol and the like may also be present as humectants or binders. Particularly advantageous liquid ingredients include a mixture of water, glycerine, and sorbitol. A gelling agent, such as the natural or synthetic gums or gum-like materials, typically Irish moss or sodium carboxymethylcellulose may be employed. Other gelling agents which may be employed include gum tragacanth, polyvinylpyrrolidone, starch and the like. They are usually present in toothpaste in an amount of up to about 10% by weight, preferably about 0.5–5%.

The pH of the final formulation of the present invention is variable and, therefore, the product may have any suitable pH value in solution compatible with the stability of the materials. Where reference is made to pH values, it has reference to the pH as determined on a liquid product per se, and in the case of a dental cream or powder or similar product as determined on a 20% aqueous slurry or mixture of said cream or powder. Thus, it is generally desired that the pH of the product after testing under the testing conditions indicated be from about 4 to 10, and preferably from about 5 to 8, with optimum desired effects being at a pH of about 5 to 6.5.

Various additional ingredients may be present in the dental preparations. These include flavoring materials, such as flavoring oils and soluble saccharin, coloring or whitening agents, preservatives such as sodium benzoate, grain prevention agents such as sodium pyrophosphate, emulsifying agents, silicones, chlorophyll compounds, antibiotics such as macrolides and the like.

In accordance with this invention, the dental preparation includes a water-soluble fluoride compound which inhibits the solubility of tooth enamel in acid solution and thereby facilitates the prevention of cavities. These compounds may be slightly soluble in water or may be fully water-soluble. They are characterized by the ability to release flouride ions in water and substantial freedom from reaction with other compounds of the dental preparation. Among these materials are inorganic fluoride salts, such as suitable alkali metal, alkaline earth metal and heavy metal salts, for example, sodium flouride, potassium fluoride, ammonium fluoride, lead fluoride, a copper flouride such as cuprous flouride, zinc fluoride, a tin fluoride such as stannic fluoride, stannous fluoride, potassium stannous fluoride ($SnF_2 \cdot KF$), or stannous chlorofluoride, barium flouride, sodium fluorosilicate; ammonium fluorosilicate; sodium fluorozirconate, sodium monofluorophosphate, aluminum mono- and di-fluorophosphate, fluorinated sodium calcium pyrophosphate, stannous fluorozirconate, and the like. Alkali metal and tin ffuorides, such as sodium and stannous fluorides and mixtures thereof, are preferred.

The amount of the fluoride compound is dependent to some extent upon the type of fluoride compound, its solubility and the type of dental composition, but it should be a nontoxic amount. In a solid dental preparation, such as a toothpaste or tooth powder, it is considered that an amount of fluoride which releases a maximum of about 1% by weight, based on the weight of the preparation, of fluoride ion is satisfactory. Any suitable minimum amount of fluoride may be used but it is preferable to employ sufficient compound to release about 0.005–1% by weight and most preferably about 0.1% by weight of fluoride ion. Typically, in the cases of alkali metal fluoride and stannous fluoride, the component is present in amounts up to about 2% by weight, based on the weight of the preparation, and preferably in amounts of about 0.05–1%. In the case of sodium monofluorophosphate the compound may be present in amounts up to about 7.6% by weight and typically 0.76%.

In a liquid dental preparation such as a mouth wash the fluoride is typically present in amount to release fluoride ion in amounts up to about 0.13% by weight, preferably 0.0013–0.1% and most preferably 0.0013–0.05%.

The olefin sulfonate detergent material used in the practice of this invention contains at least about 62% by weight of long-chain alkenyl sulfonate, up to about 33% of hydroxy alkane sulfonate and no more than about 5% of water-insoluble impurities, such as long-chain sultones.

The detergent material typically contains long-chain alkenyl sulfonates and is produced by the sulfonation of mono-olefins, using sulfur trioxide ($SO_3$) as the sulfonating agent. Thus $SO_3$ is reacted with olefins of the formula $R_1CH=CHR$, wherein R is an alkyl radical and $R_1$ is alkyl or hydrogen, preferably hydrogen, by bringing a stream of $SO_3$, highly diluted with an inert gas such as air, into contact with the olefin, preferably an alpha-olefin, to produce a viscous acidic product which contains alkene sulfonic acids and sultones. On hydrolysis and neutralization, as by treatment with strong aqueous alkali, sultones in the product are converted to the corresponding hydroxy-alkane sulfonates, giving an olefin sulfonate product containing a minor proportion of long chain alkenyl sulfonic acids and a greater proportion of long chain hydroxyalkane sulfonic acids (e.g., a major portion such as 70% of the total anionically active component), together with water-insoluble inactive long chain compounds such as sultones. To produce higher yield of the preferred olefin sulfonates, the $SO_3$-olefin reaction product may be treated with strong sulfuric acid prior to neutralization. After neutralization, the product of the treatment, which is preferably employed in the practice of the present invention, has an increased proportion of alkenyl sulfonate and a minor proportion (for example, 1/3 of the total sulfonate content or less) or none at all, of the hydroxyalkane sulfonate. Analysis of the product indicates that the major portion of its alkenyl sulfonate content is usually $\Delta$-3,4-alkenyl sulfonate. The olefin sulfonate detergents also may contain minor quantities of disulfonates, presumably produced in the course of sulfonation treatment by reaction of excess $SO_3$ with the alkenyl sulfonate formed during sulfonation.

The $\alpha$-olefin feedstock to be sulfonated preferably contains olefins of 8–25 carbon atoms, most preferably 12–21 carbon atoms. The feedstock may contain minor amounts of other constituents such as secondary or internal olefins, diolefins, cyclic olefins, aromatics, naphthenes and alkanes, and may be produced by cracking of petroleum wax, catalytic polymerization of ethylene, dehydration of long-chain alcohols, etc. Best results have thus far been obtained when $\alpha$-olefins (where $R_1$ is H) constitute a major proportion, for example, above 70% and preferably at least 90% of the feedstock. A particularly preferred olefin feedstock contains in the range of about 12 to 21 carbon atoms in the molecule and yields olefin sulfonates having excellent detergency properties. Especially good foaming characteristics have been obtained by the use of a feedstock whose alpha-olefin content consists essentially of compounds of 15 to 18 carbon atoms.

For use in the dental preparations of this invention, the proportion of acetone-soluble components, such as long-chain water-insoluble sultones is kept at a minimum, e.g., no more than about 5% by weight of the anionically active constituent of the detergent material. By using feedstocks of very high concentration of $SO_3$-reactive components and using the above-mentioned sulfuric acid treatment, the amount of such acetone-soluble components can be decreased substantially.

Detergent material even when prepared in the manner described above typically still contains water-insoluble, acetone-soluble material. Further purity may be attained through extraction or recrystallization prior or subsequent to neutralization of the $SO_3$-olefin reaction product and prior to incorporation of the detergent material in the fluoride dental preparation. Use of extracted olefin sulfonate permits maximum presence of fluoride ion, as well as stannous ion, if present, in the dental preparation; whereas if crude detergent material were used, the concentration of the soluble fluoride ion and soluble stannous ion, if present, would be substantially diminished.

Extraction of the olefin sulfonate may be performed by adding to about 15 parts by weight of crude olefin sulfonate about 100 parts by weight of a 3:1 by weight acetone-water solution. The product is left standing for several hours at about 49–60° C. Remaining undissolved solids are again treated with about 100 parts by weight of a 3:1 by weight acetone-water solution and left standing for several hours at 49–60° C. The products are filtered and the clear filtrates chilled for several hours at 4–5° C., thereby forming olefin sulfonate precipitates which are separated by filtration, washed with acetone and dried.

In an alternate extraction technique, the olefin sulfonate is first extracted with anhydrous ethanol (for example, with 10 times its weight of ethanol, under reflux, at the boil), the undissolved salts are filtered off, and acetone is added to the filtrate until the latter becomes cloudy; the cloudy solution is then cooled to, say, 4–5° C. to form a precipitate which is then washed with hot acetone.

A further technique for removal of acetone-soluble impurities which may be employed is to treat olefin-sulfur trioxide reaction product including acetone-soluble material with acetone and a base such as sodium hydroxide. The acetone dissolves sufficient base to facilitate reaction to form sulfonic acid salt. This salt is sufficiently insoluble in the acetone so as to permit its preparation in very high yields, while leaving acetone-soluble material, such as sultones in solution.

The olefin sulfonate detergent is generally employed in the form of its sodium salt. It is within the scope of this invention to use other water-soluble salts, for example, salts of other alkali metals such as potassium, salts of alkaline earth metals, such as magnesium and calcium, triethanolamine salts and the like as well as mixtures of a salt such as a sodium salt with the free olefin sulfonic acid.

The following examples are given to illustrate the invention. All parts and proportions in the examples are by weight unless otherwise indicated.

EXAMPLE 1

$C_{15}$–$C_{18}$ olefin sulfonate containing sodium alkenyl sulfonate and sodium hydroxy alkane sulfonate is prepared and extracted in the manner described below and blended with other ingredients, as tabulated below, to form a dental cream.

| | Percentage |
|---|---|
| Glycerine | 27.1 |
| Irish moss gum | 1.3 |
| Sodium benzoate | 0.15 |
| Sodium saccharinate | 0.2 |
| Water | 21.65 |
| Recrystallized sodium olefin sulfonate | 2.0 |
| Insoluble sodium metaphosphate (polishing agent) | 40.6 |
| Anhydrous dicalcium phosphate (polishing agent) | 5.0 |
| Titanium dioxide | 0.4 |
| Stannous fluoride | 0.4 |
| Flavor | 1.2 |

The toothpaste has a pH of 4.9, shows very satisfactory and rapid foam and has a satisfactory taste. These properties are stable to storage in an oven at 60° C. for four weeks. Orange juice drunk soon after the teeth are brushed with this paste gives substantially no undesirable flavor reaction.

The extracted olefin sulfonate detergent material used in the above formula is prepared by reacting air-diluted $SO_3$ with an olefin feedstock followed by treatment of the resulting viscous acidic product with 97% sulfuric acid, neutralization, by reaction at about 95° C. with excess aqueous sodium hydroxide for four hours, followed by treatment of the resulting aqueous syrupy product on a pair of rotating drums heated to about 150° C. to drive off water; the resulting product has a content of anionically active material of 74%, on a dry basis, and a content of "free oil" of about 2.4% (based on the amount of active material). "Free oil" is material obtained on pentane extraction of an aqueous ethanol solution of the product. The product is then dissolved, reprecipitated and washed, followed by recrystallization, as described below.

The olefin feedstock contains about 88% of terminally unsaturated straight chain olefins, having an average molecular weight of 230 and an average chain length of about 15 to 18 carbons ($C_{15}$–24%, $C_{16}$–29%, $C_{17}$–30%, $C_{18}$–17% approximately), and has a boiling range, at atmospheric pressure, of about 265–300° C. (with 11% residue). In the sulfonation reaction, the olefin feedstock is distributed as a falling film over the inner wall of a vertically mounted reaction tube (6 meters high) at the top thereof, and a gaseous mixture of air and $SO_3$ (4% $SO_3$ by volume) is injected downward at a high volumetric ratio into the center of the reaction tube at the top thereof. The ingredients are supplied at the following hourly rate: 17 kilograms olefin feedstock; 6.5 kilograms $SO_3$; 2.5 kilograms sulfuric acid.

The sodium olefin sulfonate is extracted by preparing a 3:1 acetone-water solution and adding 15 parts of the crude sulfonate to 100 parts of the solution. The system is left standing overnight at 50° C., during which time most of the solids dissolve. The remaining solids are separated and added to another 3:1 acetone-water solution and again left standing overnight at 50° C. The filtrate is then separated from the precipitate and combined with the original filtrate. The clear filtrates are then chilled overnight at 4.4° C. to form a precipitate of sodium olefin sulfonate. The extraction is completed by separating the precipitate from the filtrate, washing the precipitate with acetone and drying.

The dental preparation of this example upon analysis to determine the soluble stannous ion concentration and the soluble fluoride ion concentration showed: Soluble stannous ion concentration 0.24%; soluble fluoride ion concentration 0.07%.

A formulation similar to that of the above example, except that the detergent material is not extracted from the crude detergent material shows upon analysis substantially lower amounts of soluble stannous ion and soluble fluoride ion concentration; specifically stannous ion concentration of 0.144% and a soluble fluoride ion concentration of 0.02%, indicating a much more unstable dentifrice.

Satisfactory results similar to those obtained with the extracted detergent material are obtained when the dicalcium phosphate agent is omitted from the formulation and when 0.76% of sodium monofluorophosphate is employed in place of stannous fluoride.

It is, therefore, apparent that treatment of the detergent material to remove substantially all of the water-insoluble, acetone-soluble material by extraction resulted in the attaining of a stable dental preparation, characterized by effective concentration of soluble fluoride and stannous ions.

EXAMPLE 2

The following mouth wash is characteristic of the instant invention.

| | Percentage |
|---|---|
| Water | 73.7 |
| Ethyl alcohol | 24.95 |
| Polyoxyethylene sorbitan monooleate (Tween 80) | 0.7 |
| Sodium olefin sulfonate | 0.58 |
| Sodium monofluorophosphate | 0.59 |
| Saccharin | 0.02 |

The procedure for making and recrystallizing the sodium olefin sulfonate is as in Example 1. This mouth wash is completely clear and homogeneous, has a pleasant foaming action when taken into the mouth, and leaves a clear breath. This mouth was is particularly effective in inhibiting the function of hydrogen ion in an incubated saliva-glucose blend.

Although the present invention has been described with reference to particular embodiments and examples, it will be apparent to those skilled in the art that variations and modifications can be substituted therefor without departing from the principles and true spirit of the invention.

We claim:

1. In a dental preparation comprising a non-toxic amount of water-soluble fluoride compound in amount which releases at least about 0.0013% by weight of fluoride ion, about 0.05–10% by weight of a detergent material and a dental dispersing agent compatible with said detergent material, the improvement which comprises employing as said detergent material an olefin sulfonate detergent material comprising at least about 95% water-soluble detergent compound, said detergent material including at least about 62% by weight of a water-soluble long chain alkenyl sulfonate.

2. A dental preparation as claimed in claim 1 wherein said olefin sulphonate contains olefinic group of 8–25 carbon atoms.

3. A dental preparation as claimed in claim 1 wherein said olefin sulphonate contains olefinic group of 12–21 carbon atoms.

4. A dental preparation as claimed in claim 1 wherein said dental dispersing agent is a mixture of water and ethanol in a ratio of about 1–20:1 by weight and said dental preparation is a mouthwash.

5. A dental preparation as claimed in claim 4 wherein said olefin sulphonate detergent material is present in amount of about 0.1–7% by weight of the dental preparation.

6. A dental preparation as claimed in claim 4 wherein said water-soluble fluoride is present in amount sufficient to release about 0.0013–0.13% by weight of fluoride ion in said mouthwash.

7. A dental preparation as claimed in claim 6 wherein said water-soluble fluoride is sodium monofluorophosphate and the ratio of said water to said ethanol is about 3–20:1 by weight.

8. A dental preparation as claimed in claim 1 wherein said dental dispersing agent is a solid water-insoluble dental polishing material, said dental preparation is a dentifrice and the nontoxic amount of the water-soluble fluoride is a nontoxic amount which releases at least about 0.005% by weight of fluoride ion.

9. A dental preparation as claimed in claim 8 wherein said olefin sulphonate detergent material is present in amount of about 0.5–5% by weight of said dental preparation.

10. A dental preparation as claimed in claim 8 wherein said dental polishing agent is insoluble sodium metaphosphate.

11. A dental preparation as claimed in claim 8 wherein said dental polishing material comprises insoluble sodium metaphosphate and dicalcium phosphate in a ratio of about 9:1 by weight.

12. A dental preparation as claimed in claim 8 wherein said dental polishing material is present in amount of about 20–99% by weight of said dentifrice.

13. A dental preparation as claimed in claim 8 wherein said water-soluble fluoride is present in amount sufficient to release about 0.005–1% by weight of fluoride ion in said dentifrice.

14. A dental preparation as claimed in claim 13 wherein said water-soluble fluoride is stannous fluoride.

15. A dental preparation as claimed in claim 13 wherein said water-soluble fluoride is sodium monofluorophosphate.

References Cited

UNITED STATES PATENTS 3,119,743  1/1964  Ericsson _____ 424—52

RICHARD L. HUFF, Primary Examiner

U.S. Cl. X.R.

424—56